United States Patent [19]

Fujimoto

[11] 4,190,411
[45] Feb. 26, 1980

[54] CENTRIFUGAL POTTING APPARATUS

[75] Inventor: Yoshiaki Fujimoto, Kurashiki, Japan

[73] Assignee: Kuraray Co., Ltd., Kurashiki, Japan

[21] Appl. No.: 929,891

[22] Filed: Aug. 1, 1978

[30] Foreign Application Priority Data

Aug. 4, 1977 [JP] Japan .................. 52/94283

[51] Int. Cl.² .......................... B29C 5/04; B29C 1/00
[52] U.S. Cl. .................. 425/434; 164/290; 264/311; 425/453
[58] Field of Search ............... 425/425, 434, 435, 117, 425/149, 430, 453; 164/114, 115, 116, 286, 289, 290; 264/310, 311; 27/272

[56] References Cited

U.S. PATENT DOCUMENTS

| 2,528,509 | 11/1950 | Goodrich | 425/576 |
| 2,803,853 | 8/1957 | Brazier | 425/576 |
| 3,095,260 | 6/1963 | Ferriot | 425/435 |
| 3,099,044 | 7/1963 | Reuter | 164/290 |
| 3,117,346 | 1/1964 | Bertin et al. | 164/490 |
| 3,442,002 | 5/1969 | Geary et al. | 264/298 |

FOREIGN PATENT DOCUMENTS 122186 4/1944 Australia .................. 164/290

Primary Examiner—W. E. Hoag
Attorney, Agent, or Firm—Barry Kramer

[57] ABSTRACT

A centrifugal potting apparatus has one or more rotators for holding housings filled with hollow semi-permeable filaments. Potting agent containers with radially-directed outlets are mounted on the rotators. Tubing connects the container outlets to potting case inlets at the ends of the filament-filled housings. Centrifugal forces during rotation force the potting agent through the tubing and into the ends of the housings.

6 Claims, 5 Drawing Figures

CENTRIFUGAL POTTING APPARATUS

FIELD OF THE INVENTION

This invention relates to an apparatus for potting the ends of a hollow-filament fluid separation apparatus. More particularly, the invention relates to centrifugal potting apparatus for potting the ends of hollow filaments within a housing during fabrication of said fluid separation apparatus.

BRIEF DESCRIPTION OF THE PRIOR ART

Fluid-separation apparatus incorporating semipermeable hollow filaments have heretofore been employed widely in medical applications, such as for artificial kidneys and for filtration and/or concentration of ascitic fluid, as well as in various industrial applications such as for the separation, concentration and purification of various solutions and gases.

In fabricating such a fluid-separation apparatus, a potting agent must be used to establish a fluid-tight seal between the housing and the hollow filament membranes which are positioned in the housing. A conventional centrifugal apparatus for achieving such a seal has already been disclosed in U.S. Pat. No. 3,442,002. Compared with other known methods such as the method wherein a potting agent is introduced into the lower end of a vertically positioned housing, the centrifugal apparatus is advantageous in that the housings are more easily handled while a uniform bonding can be accomplished.

However, the known centrifugal molding apparatus has only a single means for feeding the potting agent to a fluid-separation housing mounted on the rotation axis so that the potting agent is centrifugally distributed toward the ends of the housing. This construction does not allow a plurality of housings to be mounted and simultaneously potted on a single molding apparatus. Since there must be one centrifugal molding apparatus for each housing, a large amount of floor space is required where a plurality of housings is to be simultaneously potted.

SUMMARY OF THE INVENTION

This invention is directed to a centrifugal molding apparatus for use in the fabrication of fluid-separation modules. The apparatus essentially comprises a vertically-positioned rotator having at least one pair of openings to mount one or more modules symmetrically disposed with respect to its axis of rotation. The rotator has means for mounting containers of potting agent on the wall of the rotator, and tubes for connecting at least one of the ends of the mounted module with the outlet of the potting agent container. The outlet from the potting agent container is on a radius from the axis of rotation.

DETAILED DESCRIPTION OF THE INVENTION

Figure 1:
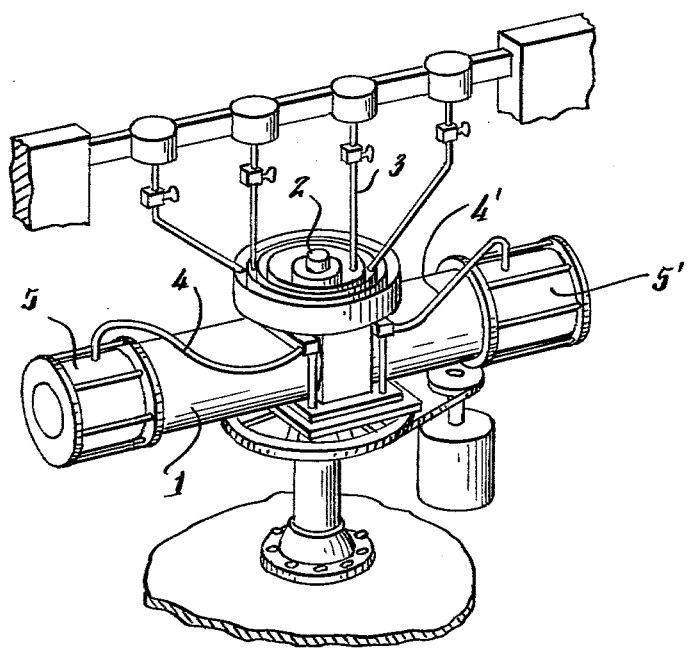
FIG. 1 is a perspective view illustrating a conventional centrifugal molding apparatus.

The fluid-separation housings to be processed by the apparatus of this invention may be any shape suitable for retaining hollow filaments. The potting agent to be employed in the practice of this invention may be any type of curable compound such as polyurethane, epoxy, silicone or other resin.

As one of its features, the apparatus of this invention includes at least one vertically-oriented rotator which is capable of mounting one to about 10 housings for simultaneous processing. This vertically-positioned rotator may be circular or polygonal in cross-sectional shape and has an axis of rotation coincident with its central longitudinal axis. The sidewalls of the rotator have one or more pairs of diametrally-opposite openings through which the housings extend upon loading. Preferably, a single pair of elongated openings for receiving a stack of housings is provided. The preferred construction is advantageous in that the housings are relatively more easily mounted and dismounted.

Means for mounting the potting agent containers are provided on the side walls of said rotator in either symmetrical relation with each other and with respect to the axis of rotation of said rotator. To establish a dynamic balance for each module, or when the potting agent is supplied to the housing through openings on opposite sides of the housing, the potting agent containers are preferably located in symmetrical relationship with respect to the axis of rotation of said rotator.

On the other hand, if the total dynamic balance of a plurality of modules mounted on the rotator is to be established without regard to the dynamic balance of each individual housing or when the potting agent is supplied to the housings through housing openings located on the same side of the housing, the potting agent containers need not be located in symmetrical relation. The relative position of a mounted housing relative to the corresponding potting agent container is not necessarily critical; however, in order that the centrifugal molding apparatus may be as compact as possible, each housing and corresponding potting agent container is preferably disposed in a common horizontal plane. The term "common horizontal plane" as used herein means not only a strictly coplanar relation but also includes deviations from said coplanar relation which are not large enough to interfere with the advantageous positioning of adjacent housings. If necessary, the means for mounting the potting agent container may be disposed in any other suitable position above or below the corresponding housing mounting opening. It is also advantageous to locate the potting agent container near the housing-mounting opening to facilitate their connection via tubing which will be described hereinafter.

The housing containing hollow-filament membranes is fitted with a potting case at one or both ends before being loaded in position on the rotator through the aforesaid openings. The potting agent container which has a supply inlet in its top wall and a potting agent outlet located on the radially outward side of the container with respect to the rotator. The potting agent outlet and the potting case on the housing are interconnected through tubing.

Prior to driving the rotator, a supply of potting agent is charged into each potting agent container. As the rotator is driven, the generated centrifugal force forces the potting agent through the tubing and into the potting case to fill the space between the hollow filament membrane and housing. The rotation of the rotator is continued until the potting agent is solidified. The rotator is then stopped, the tubings are detached and the modules are dismounted from the apparatus. The cemented ends are trimmed by conventional techniques.

A certain type of module is potted only at one end. This invention is, of course, applicable to modules of that type. In such applications, the overall dynamic balance of the setup can be ensured by disposing the potting agent containers in an alternating arrangement. It is also possible to balance the setup by filling the empty containers with a suitable load e.g. water.

In an apparatus for processing a plurality of modules simultaneously, it is important that the rotator be dynamically balanced. The problem can be effectively solved by increasing the mass of the rotator to a certain degree or by providing the rotator with suitable means for absorbing oscillation. The rotator may be constructed of metal or a fiber-reinforced plastic material.

Referring to the drawings, FIG. 1 is a perspective view illustrating the conventional centrifugal potting apparatus wherein a module 1 is mounted on a rotating shaft 2 in a substantially central position and a mechanism 3 for feeding a potting agent is disposed above the rotating shaft 2.

As the module 1 is rotated, potting agent, which is gravity or pressure fed to annular storage bins at the top of shaft 2, is centrifugally forced through tubes 4, 4' into potting cases 5, 5' at ends of the mounted module.

Figure 2:
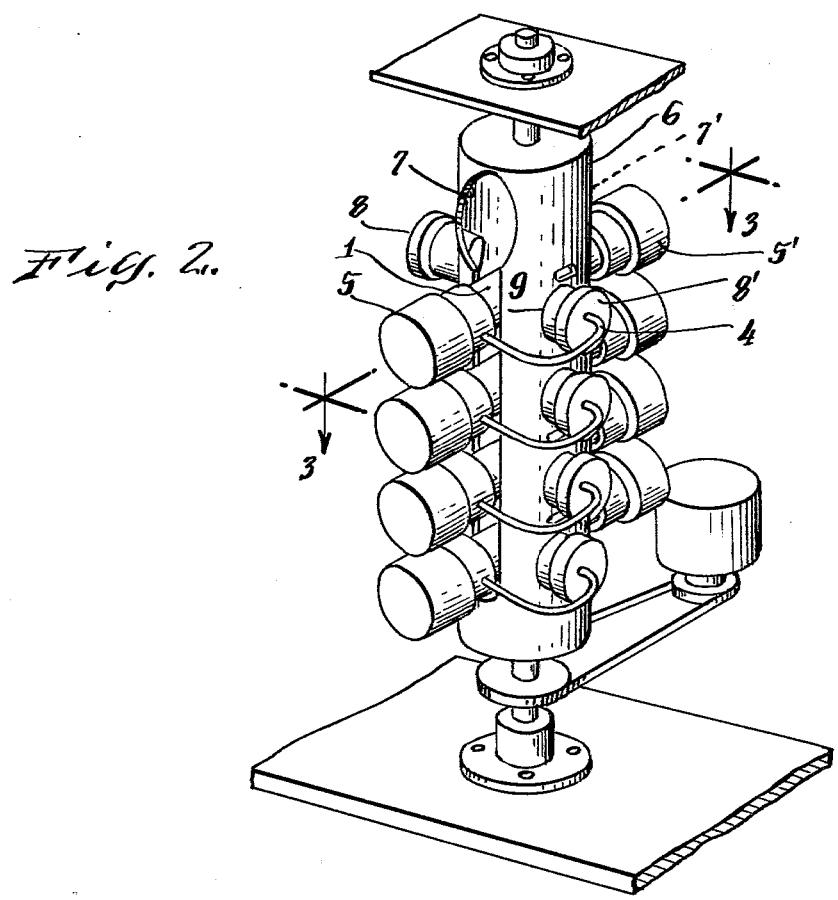
FIG. 2 is a perspective view showing a centrifugal molding apparatus according to the present invention.
Figure 3:
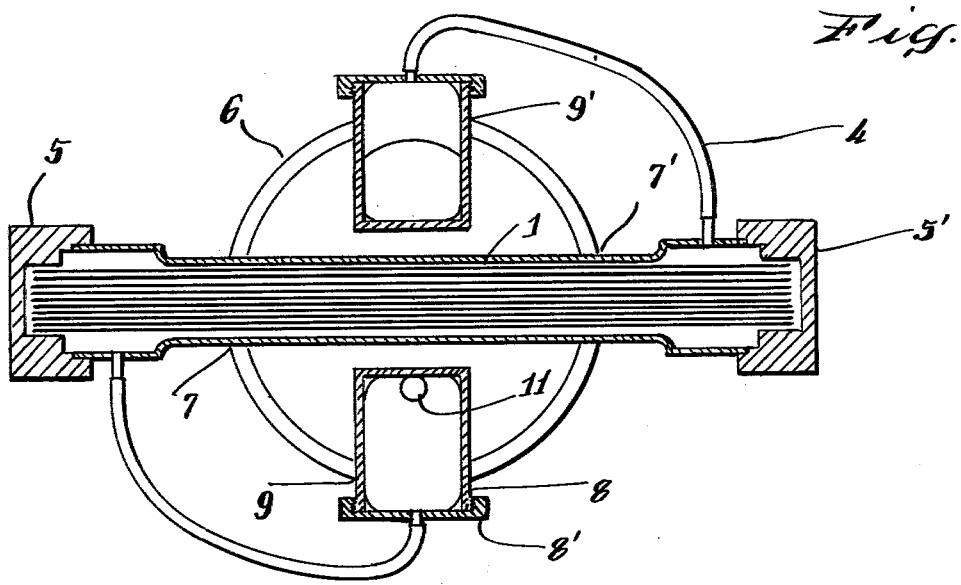
FIG. 3 is a cross-sectional view of the rotator of the apparatus illustrated in FIG. 2.

Referring now to FIG. 2, which shows an embodiment of this invention and to FIG. 3 which shows a cross-sectional view of the rotator of the apparatus of FIG. 2 taken along lines 3—3 therein, a module 1 is fitted with potting cases 5, 5' at respective ends and mounted on a rotator 6 through openings 7, 7'. The openings are shown as continuous slits, which is a preferred embodiment. Potting agent containers 8 are mounted at holes 9 provided in the side wall of rotator 6. Each potting case 5 is connected directly or through housing openings to the corresponding potting agent container through tubing 4. For an effective centrifugal feed of the potting agent it is desirable that the potting agent container 8 have an outlet 10 on a radius of the rotator 6. Furthermore, it is also desirable that the internal configuration of the container 8 be tapered toward the outlet 10 so that the potting agent will be completely discharged by the centrifugal force generated by the rotation of said rotator 6. The potting agent container 8 is further provided with a supply aperture 11 through which the potting agent is charged into the container 8 prior to rotation of the rotator 6. The potting agent may be a one-component or a two-component agent and, if necessary, may be prepared in a separate vessel and, then, supplied to the container 8 via the aperture 11 with use of, for example, a nozzle. Depending on the type of potting agent, prolonged cure time may be required. When such a slow-curing compound is employed, it is advantageous to heat the rotator and ambient atmosphere with hot gas to accelerate the curing reaction of the agent. An electric heater may likewise be employed.

Figure 4:
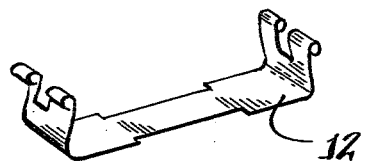
FIG. 4 is a view showing the frame which may be used in the mounting of a fluid-separation housing on the rotator of the apparatus according to this invention.

In mounting each housing on the rotator 6, it is preferable that module 1 be installed in a frame such as the one illustrated in FIG. 4 and the assembly loaded onto the rotator. Such a frame may consist of a rigid bottom plate member and a pair of side plate members, the side plate members being inwardly inclined to accept and lock the module at both ends. The bottom plate member is provided with shoulders 12, by means of which the frame is secured easily to the rotator. With such a frame, the module can be easily mounted on the rotator and a shifting of the module during rotation can be effectively prevented.

The potting agent container 8 may be secured to the hole 9 by suitable means, including welding. The container 8 may be provided with a detachable cap 8', and a separate inner liner may be provided so that the potting agent is contained by the liner, instead of container 8. The liner which may be made of a plastic material such as polypropylene or polyethylene, is advantageous in that it prevents the inner wall of the container 8 from being soiled by the potting agent.

Figure 5:
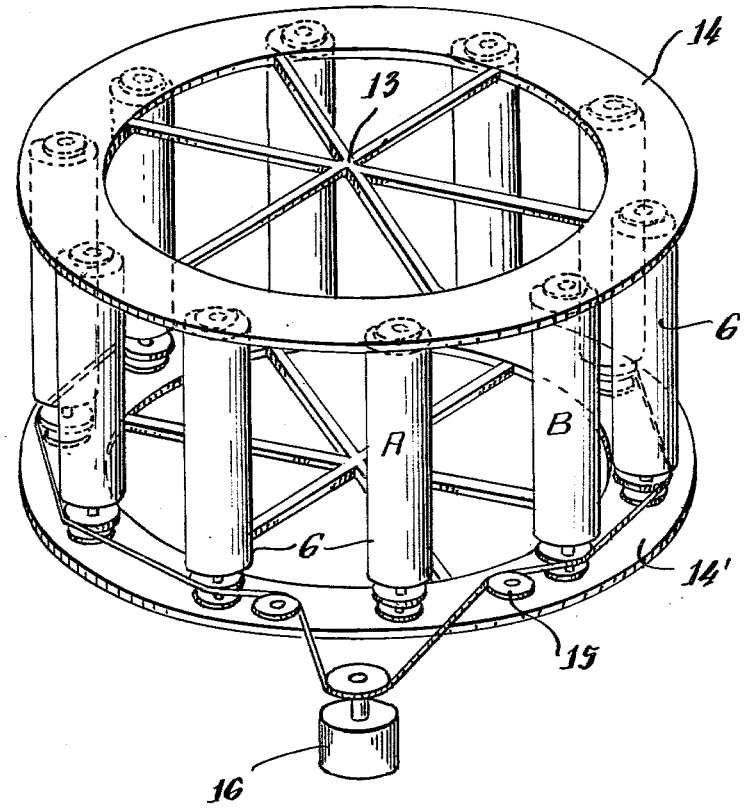
FIG. 5 is a diagrammatic view illustrating another embodiment of this invention which includes a plurality of rotators.

FIG. 5 is a diagrammatic view illustrating another embodiment of this invention wherein a plurality of centrifugal molding apparatus units are integrally arranged in a single device to provide continuous potting of a large number of fluid-separation modules.

A number of rotators, each carrying a plurality of modules mounted thereon in the manner described hereinbefore, are arranged on a circular supporting means or turret which rotates about a central axis 13. The rotator is rotated at high speed about its own axis on the rim of the turret, which revolves slowly to move the individual rotators about the axis 13 on the circular supporting rims 14, 14'. The turret moving force is supplied from a conventional drive means such as an electric motor (not shown). A transmission mechanism 15, which may be a belt driven by a motor 16, is used to drive the individual rotators.

Referring to FIG. 5, when a rotator has reached a predetermined position generally indicated at A, this particular rotator stops revolving as it is released or disengaged from the drive-transmission mechanism 15. During this period of disengagement potted modules are removed from the particular rotator and preparatory operations are performed such as loading untreated modules, recharging potting agent containers and attaching tubing.

After all these operations have been completed, the rotator is moved to position B by energization of the turret drive means where it is re-engaged by the transmission mechanism, whereupon the potting agent is driven by a centrifugal force into the ends of the modules mounted on the rotator. The speed of revolution of the turret is controlled so that the potting agent will have been sufficiently set by the time the turret has completed one revolution about axis 13, returning the two-treated modules to position A. The process described above is repeated. In foregoing manner, the filling and bonding of module ends with the potting agent can be efficiently accomplished in position A while other modules continue to be treated. As will be apparent from the above description, an exceedingly large number of modules may be processed in a small space.

If necessary, a heating means may be provided along or adjacent the turret. The provision of such a heating means results in a more efficient thermal curing of the potting agent and, hence, a further improvement in the productivity of fluid-separation apparatuses.

What we claim is:

1. Centrifugal potting apparatus comprising:
   a rotator adapted for rotation about an axis of rotation;
   a housing mounted on said rotator and disposed essentially symmetric with respect to said axis of rotation,
   said hausing being provided with a pair of potting cases each spaced from said axis of rotation and adapted to receive a potting agent therein upon rotation of said rotator;
   a pair of individual container means respectively associated with said pair of said potting cases and each adapted for holding a separate source of a potting agent to be delivered to the corresponding potting case under centrifugal force produced by rotation of said rotator, each of said container means being secured to a side of said rotator and in spaced relationship to said axis of rotation; and
   tube means operably coupling said pair of container means with the respectively associated potting cases for delivering potting agent from the former to the latter upon rotation of said rotator.

2. The apparatus of claim 1, wherein:
   said pair of potting cases and said pair of individual container means are disposed essentially coplanar, and
   each of said pair of container means are provided with an opening therein having the longitudinal axis thereof extending in a direction radially outward from said rotation axis of rotation.

3. The apparatus of claim 1, including:
   a plurality of said housings and a plurality of said pairs of container means respectively associated with the corresponding ones of said potting cases,
   said rotator including a longitudinal slot therein extending in a direction essentially aligned with said rotation axis of rotation and having each of said housings mounted therethrough in aligned side-by-side relationship to each other.

4. The apparatus of claim 1, including:
   a plurality of said rotators;
   first and second spaced apart support means for rotatably mounting the opposite extremities of each of said plurality of rotators,
   said first and second support means being mounted for revolution about a reference axis spaced from each of said rotational axis of said plurality of rotators; and
   means operably coupled with at least one of said first and second support means for selectively driving each of the latter to revolve about said reference axis.

5. Centrifugal potting apparatus, comprising:
   a rotator adapted for rotation about an essentially vertical axis;
   at least one potting housing mounted on said rotator and provided with a pair of potting cases radially spaced from said vertical axis;
   at least a pair of individual containers respectively associated with said pair of potting cases and each adapted for holding a separate quantity of a potting agent therein to be delivered to the corresponding potting cases under centrifugal force produced during rotation of said rotator, said pair of containers being respectively secured to opposite sides of said rotator in radially spaced relationship to said vertical axis and in angularly offset relationship to the respectively associated potting cases about said vertical axis, each of said containers including an aperture therein extending radially outward from said vertical axis; and
   tube means operably coupling each of said apertures with the respectively associated potting cases for delivering potting agent from the container to the corresponding potting cases upon rotation of said rotator.

6. The apparatus of claim 5, including:
   circularly shaped turret structure adapted for rotation about a central axis of rotation; and
   a plurality of said rotators mounted at circumferencially spaced positions along the periphery of said turret structure for rotation about their corresponding vertical axis, said plurality of rotators also being rotatable about said central axis upon rotation of said turret structure.

* * * * *

UNITED STATES PATENT AND TRADEMARK OFFICE
CERTIFICATE OF CORRECTION

PATENT NO. : 4,190,411
DATED : Feb. 26, 1980
INVENTOR(S) : Yoshiaki Fujimoto

It is certified that error appears in the above-identified patent and that said Letters Patent are hereby corrected as shown below:

In claim 1, line 10: delete "hausing" and insert therefor --housing--.

Signed and Sealed this

Fifteenth Day of July 1980

[SEAL]

Attest:

SIDNEY A. DIAMOND

Attesting Officer

Commissioner of Patents and Trademarks